May 21, 1929.   R. H. WENTORF   1,713,577
CAKE BAKING PAN
Filed May 2, 1924
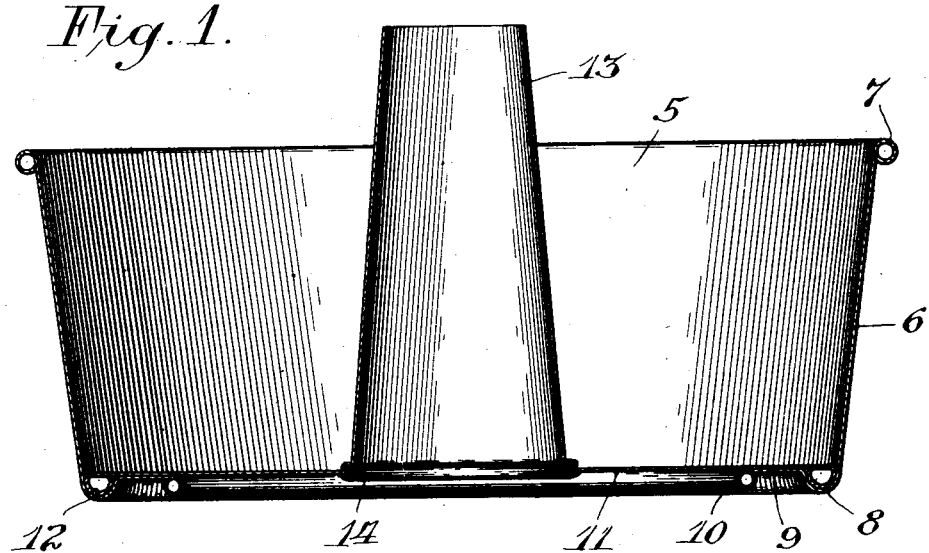
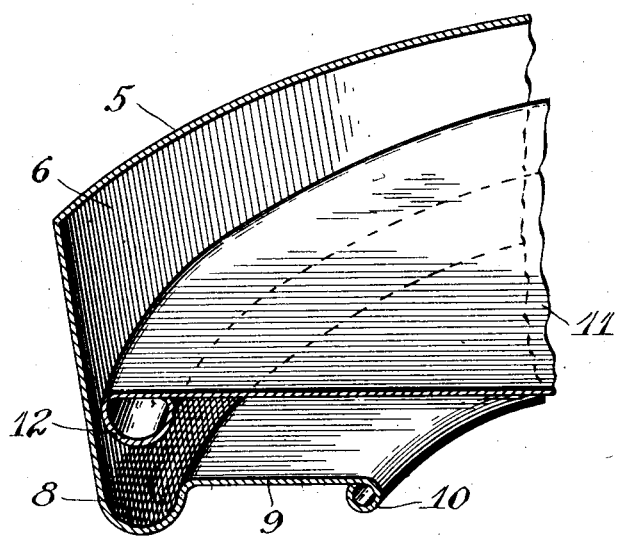
Inventor.
Robert H. Wentorf,
By Sprinkle & Smith
Attys.

Patented May 21, 1929.

1,713,577

UNITED STATES PATENT OFFICE.

ROBERT H. WENTORF, OF WEST BEND, WISCONSIN, ASSIGNOR TO WEST BEND ALUMINUM COMPANY, A CORPORATION OF WISCONSIN.

CAKE-BAKING PAN.

Application filed May 2, 1924. Serial No. 710,484.

This invention relates to a cake baking pan and more particularly to a baking pan with a removable bottom for baking cakes.

One of the objects of the present invention is to provide an improved form of a cake baking pan with a removable bottom and having a construction which gives unusual strength and rigidity to the places that can be most easily damaged by rough handling and thereby insures perfect cake baking results over a long period of time.

A further object of the invention is to provide an improved form of removable bottom for a cake pan and in which the removable bottom is adapted to seat itself snugly in the bottom of the pan proper in a manner which prevents the cake batter from seeping out of the pan.

A still further object of the invention is to provide a general improved form of cake pan which enables the housewife to easily remove the cake from the pan after baking without damaging it.

These and other objects are accomplished by providing a construction and an arrangement of the various parts in a manner hereinafter described and pointed out in the appended claims.

Referring to the drawings, Fig. 1 is a cross sectional view taken on a vertical plane passing through the diameter of the pan showing the construction of my improved cake baking pan, and Fig. 2 is an enlarged fragmentary view partly in section, showing the removable bottom partially removed from its seat in the bottom proper of the pan.

In the form of cake baking pans now in general use of the type provided with a removable bottom, the bottom is usually a flat disc-like member which seats itself on a flange forming the bottom proper of the pan. With this construction it is impossible to maintain the inset or removable bottom in contact with the bottom proper of the pan, especially so, after the pan has been used for any length of time, as dents are usually formed in the removable bottom and in the flange of the pan causing the improper seating of the removable bottom on the bottom of the pan proper, and thereby permitting the cake batter to seep through the removable bottom and the bottom of the pan proper.

In carrying out my invention I have shown the same in connection with a cake baking pan which is ordinarily used to bake angel cake and the like, and comprises a relatively deep pan 5 having a relatively tapered wall 6 which is strengthened at the upper end by the usual bead 7. The bottom of the pan is provided with an annular concavity or groove 8 which extends entirely around the pan adjacent the bottom of the wall 6. The groove 8 is substantially semicircular in cross section as shown in Figs. 1 and 2, and has its inner portion extending upwardly and inwardly as shown at 9 forming a flat portion which extends substantially parallel to the normal bottom of the pan. This flat portion 9 which forms the bottom for the pan 5 terminates at its inner edge in a circular bead 10 which forms an opening centrally in the bottom and reinforces and strengthens the bottom proper of the pan. Mounted in the pan 5 is a removable bottom 11 which is in the form of a disc-member and has formed adjacent its peripheral edge on the lower side thereof, a bead 12 which is semi-circular in cross section and adapted to be seated in the annular groove or concavity 8 in the bottom of the pan 5.

It will be noted that the bead 12 of the removable bottom 11 is so formed with respect to the annular groove 8 of the pan 5 that the flat portion 9 of the pan 5 substantially contacts with the lower side of the removable bottom 11 when the removable bottom is properly seated in the bottom proper of the baking pan. This construction it will readily be seen affords a very snugly fitting connection between the removable bottom and the bottom proper of the pan, and further insures or prevents the cake batter from seeping between the removable bottom and the bottom of the pan.

It will further be noted that by positioning the peripheral bead on the removable bottom that I have provided unusual strength and rigidity to that part of the removable bottom which can be most easily damaged by rough handling, and at the same time provided a construction in which the pan proper is reinforced and strengthened by the provision of the annular groove 8 and the circular bead 10 formed in the bottom of the pan. The removable bottom 11 is provided with a conical member 13 which is secured centrally in an aperture of the bottom preferably by having portions of the conical member upset and pressed together as shown at 14.

In the above description it will further be noted that by having the wall 6 of the pan 5 tapered and positioning the annular groove 8 adjacent the lower edge of the tapered wall that the removable bottom seats itself snugly in the bottom of the baking pan in such a manner that the batter is prevented from seeping between the removable bottom and the bottom of the pan.

While in the above specification I have described one embodiment which my invention may assume, it will of course be understood that the same is capable of modification and that modification may be made without departing from the spirit and scope of my invention as expressed in the following claims.

What I claim as my invention and desire to secure by Letters Patent is:

1. The combination with a baking pan of a removable bottom therefor, an annular groove formed in the bottom of said pan adjacent the wall thereof, and a bead formed on the edge of said removable bottom in a manner to provide a flat surface on its upper side, said bead being adapted to seat in said groove to form a single joint adjacent the bottom of said wall.

2. A baking pan comprising a circular wall, a bottom portion having an opening and an annular groove formed therein, said groove being positioned adjacent said wall, a removable bottom having a flat surface extending over its entire upper side, and a peripheral bead formed on the lower side of said removable bottom and adapted to seat in said groove in a manner to form a joint between said removable bottom and pan adjacent said wall.

3. A baking pan comprising an inclined circular wall, a bottom portion having an opening therein formed integrally with said wall and having an annular groove formed in said bottom portion adjacent said wall in a manner to form a continuation thereof, a removable bottom, and a closed bead formed on the lower side and peripheral edge of said removable bottom adapted to fit snugly in said groove in a manner to form a single joint between said removable bottom and pan adjacent said wall.

4. A baking pan comprising an inclined circular wall, a bottom formed in said pan having an opening therein, a circular bead formed in the bottom of said pan for reinforcing and strengthening said bottom, said bottom having a groove formed therein and a removable bottom having a peripheral bead of semi-circular cross section formed on the edge thereof and adapted to be seated in the groove in the bottom of said pan for snugly securing said removable bottom to said pan.

5. A baking pan comprising an inclined circular wall, a bottom formed in said pan having an opening therein, a circular bead formed in the bottom of said pan adjacent the opening therein for reinforcing and strengthening said bottom, said bottom having a circular groove formed therein and a removable bottom having a flat top and a bead of semi-circular cross section formed on the periphery thereof and on the lower side of the removable bottom for seating said removable bottom in the bottom of said pan and providing a bottom having a flat upper side and a single joint adjacent the bottom of said wall.

6. A baking pan comprising an inclined circular wall, a bottom portion having an opening therein formed integrally with said wall and having an annular groove formed in said bottom portion adjacent said wall in a manner to form a continuation thereof, a removable bottom having a flat top surface, and a closed bead formed on the lower side and peripheral edge of said removable bottom adapted to fit snugly in said groove in a manner to form a single joint between said removable bottom and pan adjacent said wall.

In testimony whereof I have signed my name to this specification, on this 26th day of April, A. D. 1924.

ROBERT H. WENTORF.